United States Patent
Okimoto et al.

(10) Patent No.: US 9,715,057 B2
(45) Date of Patent: Jul. 25, 2017

(54) SURFACE LIGHT SOURCE DEVICE AND LIQUID CRYSTAL DISPLAY DEVICE

(71) Applicant: Mitsubishi Electric Corporation, Tokyo (JP)

(72) Inventors: Nami Okimoto, Tokyo (JP); Saki Maeda, Tokyo (JP); Eiji Niikura, Tokyo (JP); Akira Daijogo, Tokyo (JP); Takeshi Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/820,009

(22) Filed: Aug. 6, 2015

(65) Prior Publication Data
US 2016/0054510 A1    Feb. 25, 2016

(30) Foreign Application Priority Data
Aug. 20, 2014  (JP) .................................. 2014-167208

(51) Int. Cl.
*F21V 8/00* (2006.01)
*G02F 1/1335* (2006.01)

(52) U.S. Cl.
CPC ......... *G02B 6/0055* (2013.01); *G02B 6/0051* (2013.01); *G02B 6/0068* (2013.01); *G02B 6/0088* (2013.01); *G02F 1/133603* (2013.01); *G02F 1/133609* (2013.01)

(58) Field of Classification Search
CPC .. G02B 6/0055; G02B 6/0068; G02B 6/0088; G02F 1/133603; G02F 1/133609
See application file for complete search history.

(56) References Cited

U.S. PATENT DOCUMENTS

| | | | |
|---|---|---|---|
| 7,719,016 B2 | 5/2010 | Nada et al. | |
| 2005/0169012 A1* | 8/2005 | Takeuchi | G02B 6/0068 362/602 |
| 2006/0290842 A1* | 12/2006 | Epstein | G02B 5/0247 349/113 |
| 2012/0106127 A1 | 5/2012 | Hattori et al. | |
| 2013/0033901 A1* | 2/2013 | Nishitani | G02B 6/0036 362/613 |

FOREIGN PATENT DOCUMENTS

| | | |
|---|---|---|
| JP | 2006-286906 A | 10/2006 |
| JP | 2008-71657 A | 3/2008 |
| JP | 2012-99362 A | 5/2012 |

* cited by examiner

*Primary Examiner* — Michael Caley
*Assistant Examiner* — Mariam Qureshi
(74) *Attorney, Agent, or Firm* — Birch, Stewart, Kolasch & Birch, LLP

(57) ABSTRACT

A surface light source device includes a laser beam source, a laser beam guide rod for converting a laser beam into first linear light, an LED light source, an LED light guide rod for converting LED light into second linear light, a reflecting bar having a reflecting portion for reflecting part of the first and second linear light and a diffusion reflecting portion for diffusing and reflecting a residual part of the first and second linear light, and a light reflecting portion formed in a box shape and having an opening portion with an emission side opened and a reflecting surface on an inside of the box shape. Part of the first and second linear light is reflected by the reflecting portion and the reflecting surface, and a residual part is diffused and reflected by the diffusion reflecting portion and is emitted from the opening portion.

11 Claims, 8 Drawing Sheets

F I G. 7A
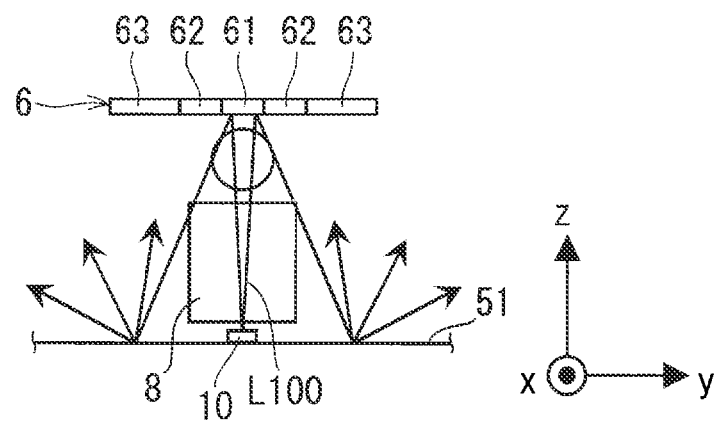
F I G. 7B
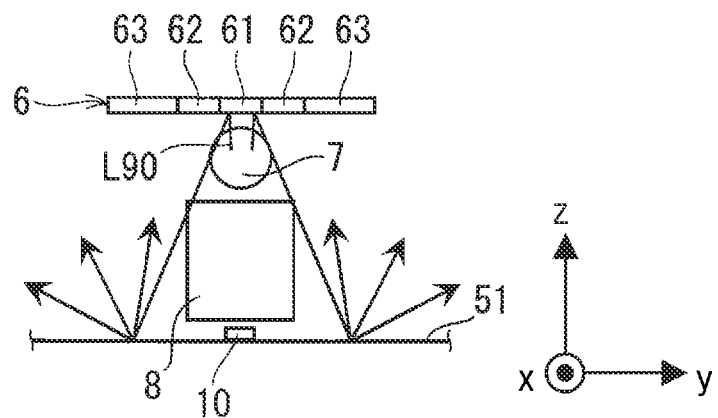

SURFACE LIGHT SOURCE DEVICE AND LIQUID CRYSTAL DISPLAY DEVICE

BACKGROUND OF THE INVENTION

Field of the Invention

The present invention relates to a surface light source device for illuminating a back surface of a liquid crystal display element by two types of light sources having different characteristics, thereby displaying an image on the liquid crystal display element, and a liquid crystal display device including the surface light source device.

Description of the Background Art

A liquid crystal display element provided in a liquid crystal display device does not emit light by itself. For this reason, the liquid crystal display device includes a backlight device (a surface light source device) as a light source for illuminating the liquid crystal display element at a back surface side of the liquid crystal display element.

Moreover, the liquid crystal display element includes a color filter and transmits, through a color filter, only light having a part of wavelengths in light emitted from a fluorescent lamp for emitting white light in a continuous spectrum, thereby extracting display colors of red, green and blue to perform color representation. In the case in which only light in a part of wavelength bands is cut out of light source light in the continuous spectrum to obtain the display color, thus, a transmission wavelength band of the color filter provided in the liquid crystal display element should be set to be narrower if color purity of the display color is to be increased in order to enlarge a color reproduction range. For this reason, if the color purity of the display color is to be increased, there is a problem in that a quantity of light transmitted through the color filter is decreased, resulting in reduction in a luminance.

A fluorescent lamp to be generally employed as a light source of a backlight device has a light emission spectrum with a peak in a wavelength shifted to an orange color of approximately 615 nm in a red wavelength range based on a characteristic of a phosphor. If the color purity is to be increased in a wavelength region of 630 to 640 nm which is preferable as pure red in the red color, therefore, there is a problem in that the quantity of transmitted light is extremely reduced, resulting in significant reduction in a luminance. In order to enlarge the color reproduction range while minimizing a light loss caused by the color filter, it is necessary to employ a light source for emitting light having a narrow wavelength bandwidth. In other words, it is necessary to employ a light source for emitting light having high color purity.

As a measure for solving the problems, in recent years, there has been proposed a liquid crystal display device including, as a light source, a monochromatic LED or laser having a narrow wavelength width, that is, high color purity. In particular, the laser has excellent monochromaticity and high light emission efficiency. Therefore, it is possible to obtain a liquid crystal display device having a large color reproduction area, providing an image of high quality with a high luminance, and having low power consumption.

In recent years, the light emission efficiency of the LED has also been enhanced. For this reason, a backlight device for a liquid crystal display element or the like has also used a technique for using three types of LEDs that respectively emit light having red (R), green (G), and blue (B) which are three primary colors of light and mixing colors of RGB light emitted from the three types of LEDs, thereby obtaining white light.

In order to enhance utilization efficiency of light emitted from a light source, furthermore, there has been used a directly under type backlight device for directly supplying light from a back surface to a liquid crystal display element.

In the liquid crystal display device including the backlight device, there has been desired technological development capable of providing a surface light source device having a simple structure through devise of a structural part and less luminance unevenness and color irregularity with high quality.

For example, Japanese Patent Application Laid-Open No. 2006-286906 discloses the technology for attaching a light emitting diode device for adjusting light traveling along a central axis of a lens to the lens covering a light emitting diode chip or a periphery thereof, thereby improving luminance unevenness and color irregularity in a liquid crystal display device.

The light emitting diode device described in the Japanese Patent Application Laid-Open No. 2006-286906 is designed for a divergence angle of an LED. The light emitting diode device can obtain white light without unevenness by mixture of the red LED light, the green LED light, and the blue LED light through direct adjustment of a direction of the light traveling along the central axis of the lens, that is, light traveling toward a display surface.

In contrast with a liquid crystal display device in which light sources having greatly different divergence angles are mixed, however, the way for propagation of light emitted from the light emitting diode device is varied due to a difference in light distribution possessed by the light source so that a difference is generated in the distribution of light illuminating the display surface every light source in the same light emitting diode device. In particular, a distribution difference between display surfaces having different colors causes color irregularity and is thus recognized visually.

A laser is a light source for emitting light having a narrow wavelength bandwidth. By using the laser, it is possible to enhance color reproductivity. However, the laser is a light source having a very small divergence angle, and is difficult to have equivalent expansion to LED light with a large divergence angle by a lens and the light emitting diode device through the same method as the LED. When distribution of a laser beam is different from that of the LED light over a display surface, luminance unevenness and color irregularity are caused.

In other words, in the case in which an LED light source and a laser beam source having a different light emission characteristic from that of the LED light source are to be simultaneously used in a surface light source device, it is necessary to match the ways of light expansion from the light source. It is difficult to create a uniform surface light source with the same structure. When two types of light sources are each caused to have structures for creating surface light sources, moreover, the structures are made complicated so that a manufacturing cost is increased.

SUMMARY OF THE INVENTION

It is an object of the present invention to provide a surface light source device and a liquid crystal display device which can display an image of high quality with a simple structure when simultaneously using two types of light sources having different light emission characteristics from each other.

The surface light source device according to the present invention includes a first light source for emitting first light, a first light guide rod, a second light source, a second light guide rod, a reflecting bar, and a reflecting member. The first light guide rod has a first light incident surface, and causes the first light to be incident from the first light incident surface and converts the first light into first linear light. The second light source emits second light having a greater divergence angle than that of the first light. The second light guide rod has a second light incident surface, and causes the second light to be incident from the second light incident surface and converts the second light into second linear light extended in the same direction as the first linear light. The reflecting bar is disposed on emission sides of the first light guide rod and the second light guide rod and has at least one reflecting portion for reflecting part of the first linear light and part of the second linear light and at least one diffusion reflecting portion for diffusing and reflecting a residual part of the first linear light and a residual part of the second linear light. The reflecting member is formed in a box shape such that the first light guide rod, the second light source, the second light guide rod, and the reflecting bar can be accommodated, and has an opening portion with the emission side opened and a reflecting surface for reflecting the first linear light and the second linear light on an inside of the box shape. The first light incident surface is an end face in a longitudinal direction of the first light guide rod. The first light source is disposed in an opposed position to the first light incident surface. The second light incident surface is a surface formed along a longitudinal direction of the second light guide rod at an opposite side to the emission side. The second light source is disposed in an opposed position to the second light incident surface. Part of the first linear light and part of the second linear light are reflected by the reflecting portion of the reflecting bar and the reflecting surface, and a residual part of the first linear light and a residual part of the second linear light are diffused and reflected by the diffusion reflecting portion of the reflecting bar and are emitted from the opening portion.

A liquid crystal display device according to the present invention includes a surface light source device, and a liquid crystal panel for displaying an image by illumination of light from the surface light source device.

The first light emitted from the first light source is converted into the first linear light by the first light guide rod and the second light emitted from the second light source is converted into the second linear light extended in the same direction as the first linear light by the second light guide rod. Part of the first linear light and part of the second linear light spread by reflection through the reflecting portion of the reflecting bar. Therefore, it is possible to obtain illumination light having uniform planar distribution. Moreover, part of the first linear light and part of the second linear light are reflected by the reflecting portion of the reflecting bar, and spread with color mixture in the reflecting member. Therefore, it is possible to prevent color unevenness from being caused by an intensity distribution difference between the first light and the second light.

Moreover, the residual part of the first linear light and the residual part of the second linear light are diffused and reflected by the diffusion reflecting portion of the reflecting bar. Therefore, the first linear light and the second linear light directed toward the opening portion can be scattered in various directions. Consequently, it is possible to suppress occurrence of color irregularity by causing increase in a color mixing property still more.

Thus, it is possible to guide the light emitted from the first light source and the light emitted from the second light source without waste when simultaneously using two types of light sources having different light emission characteristics from each other. Therefore, utilization efficiency of the light can be increased so that an image of high quality can be displayed. Moreover, the display of the image of high quality can be implemented with a simple structure.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 7A and 7B are configuration views schematically showing a function of a reflecting portion of the reflecting bar;

DESCRIPTION OF THE PREFERRED EMBODIMENTS

First Preferred Embodiment

Figure 1:
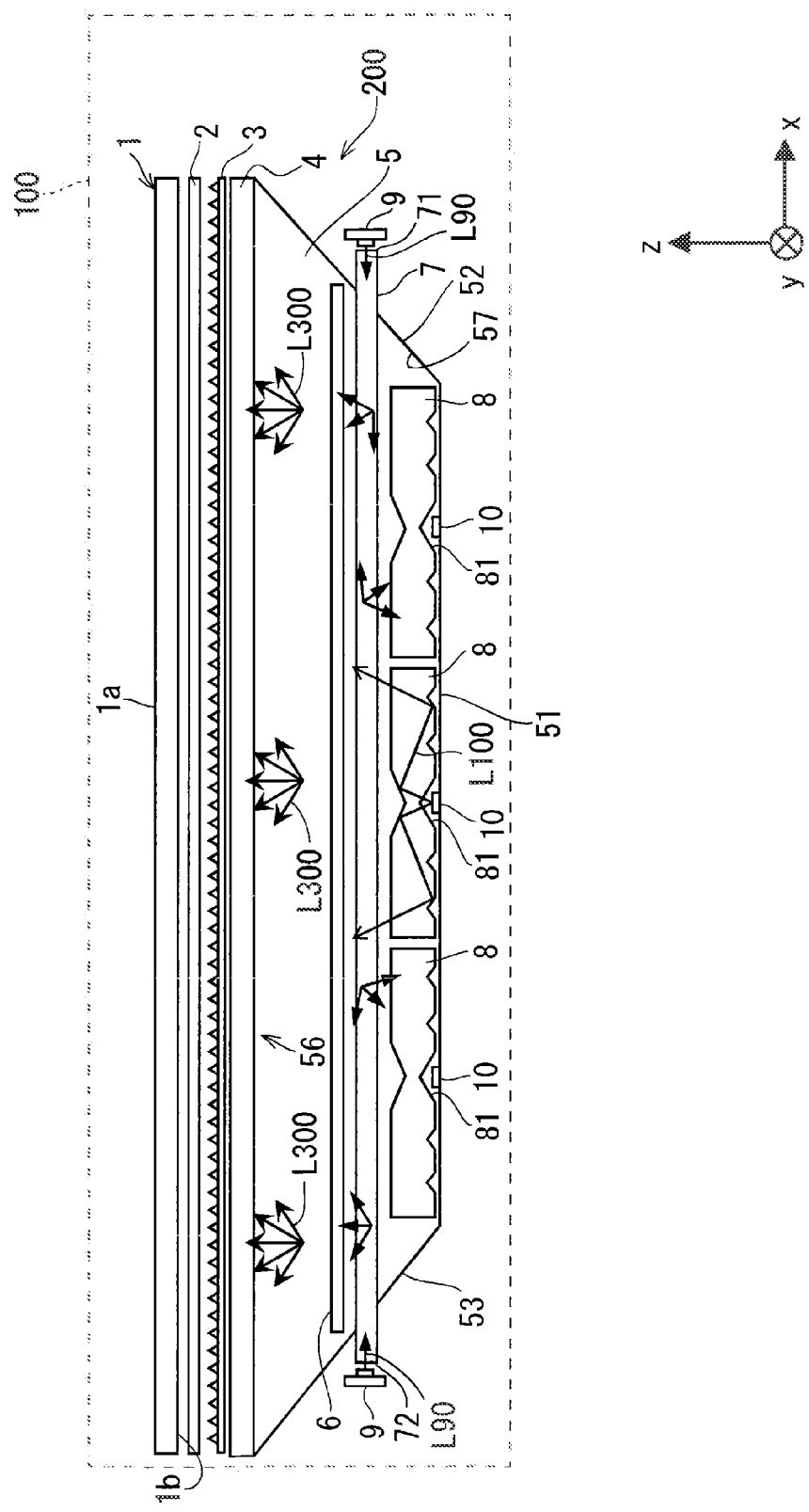
FIG. 1 is a view schematically showing an example of a structure of a liquid crystal display device according to a first preferred embodiment.
Figure 2:
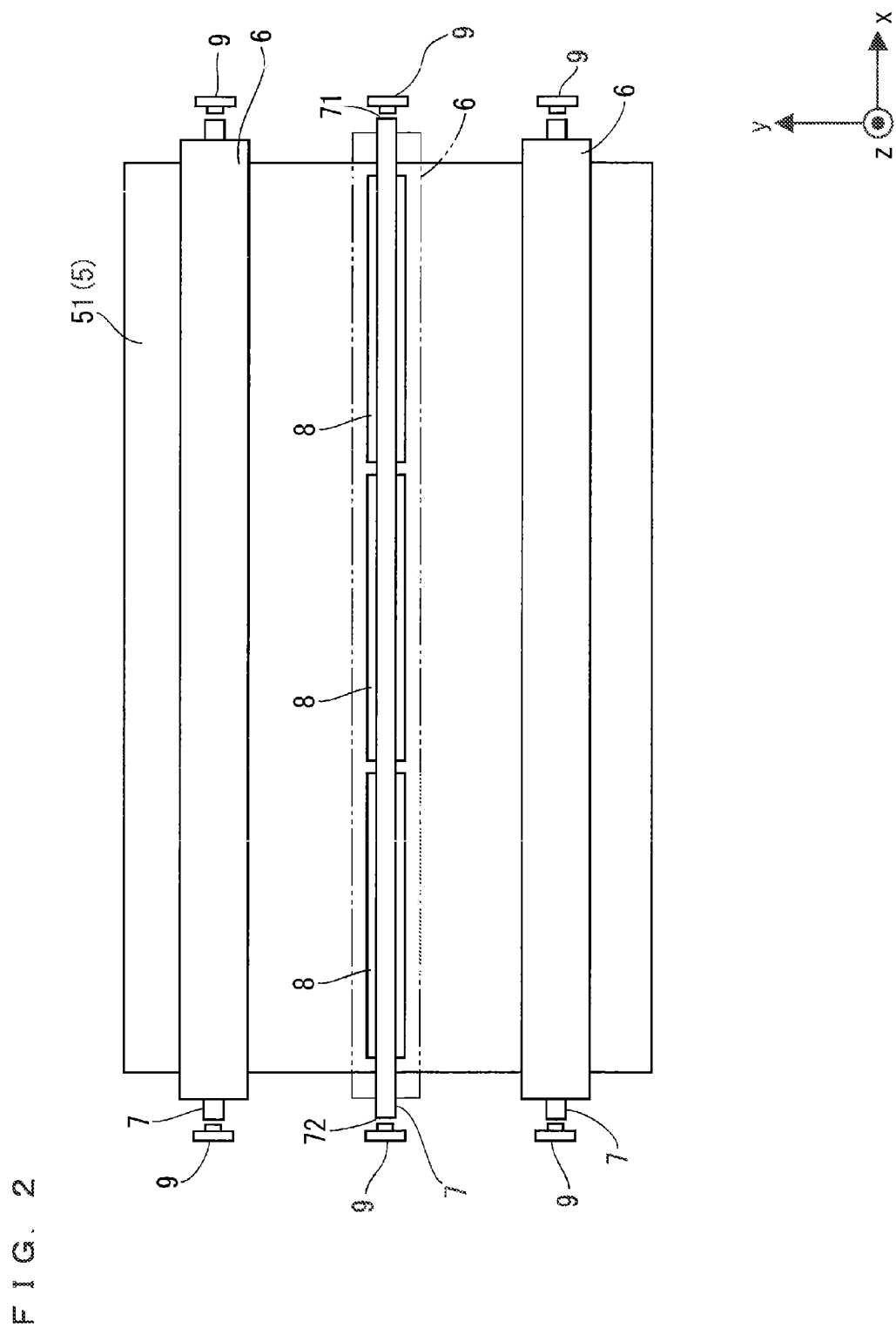
FIG. 2 is a view schematically showing an example of a structure of a surface light source device.
Figure 3:
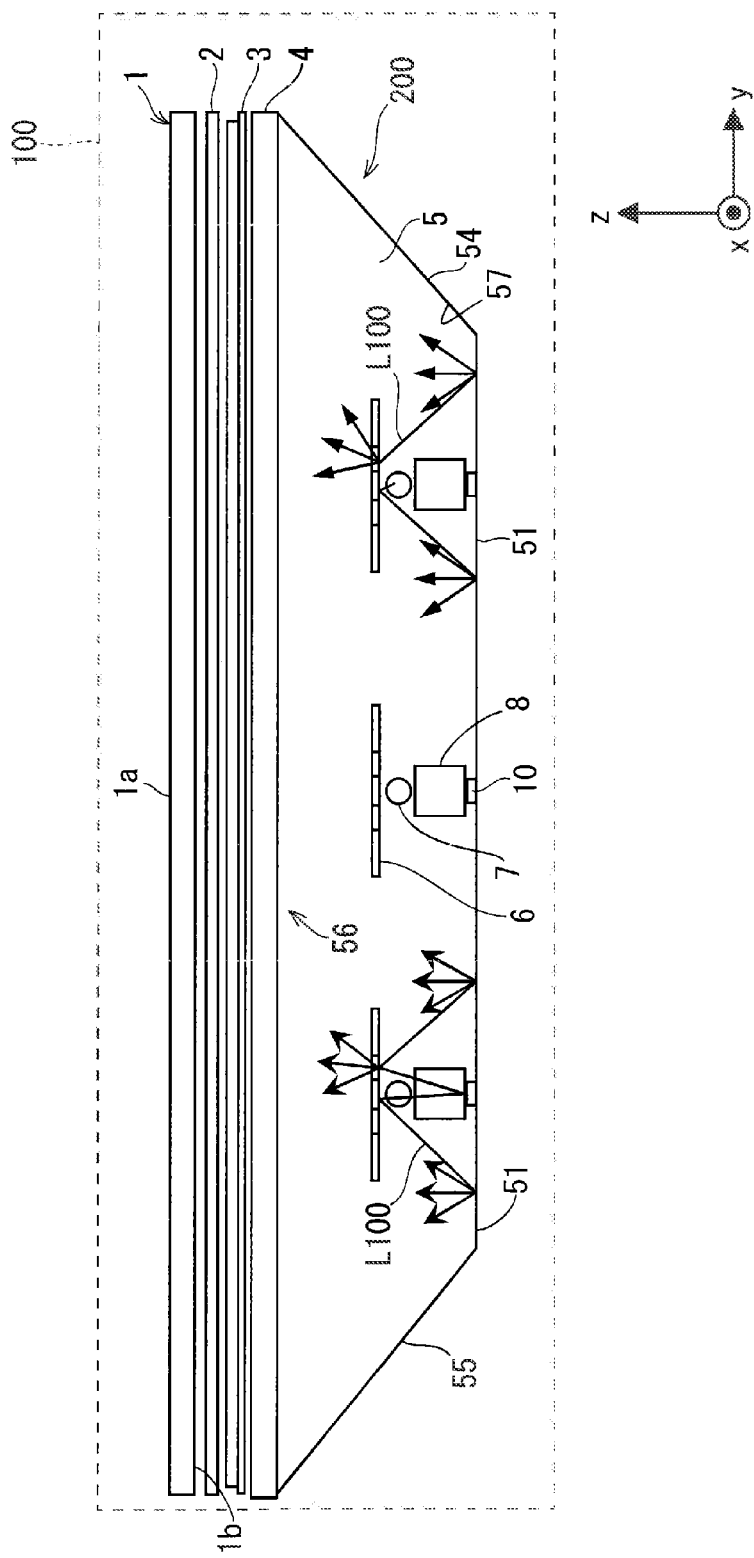
FIG. 3 is a view schematically showing an example of the structure of the liquid crystal display device.

A first preferred embodiment according to the present invention will be described below with reference to the drawings. FIG. 1 is a view schematically showing an example of a structure of a liquid crystal display device 100 according to the first preferred embodiment, FIG. 2 is a view schematically showing an example of a structure of a surface light source device 200, and FIG. 3 is a view schematically showing an example of the structure of the liquid crystal display device 100.

As shown in FIG. 1, the liquid crystal display device 100 includes a transmission type liquid crystal panel 1 formed of a liquid crystal display element, an optical sheet 2, an optical sheet 3, and the surface light source device 200. Moreover, although not illustrated in FIG. 1, the liquid crystal display device 100 further includes a control unit 31, a liquid crystal panel driving unit 32, an LED light source driving unit 33*a*, and a laser beam source driving unit 33*b* as shown in FIG.

4. The details of the control unit 31, the liquid crystal panel driving unit 32, the LED light source driving unit 33a, and the laser beam source driving unit 33b will be described later.

The surface light source device 200 is disposed on a back surface 1b side of the liquid crystal panel 1 and serves to illuminate the back surface 1b of the liquid crystal panel 1 through the optical sheet 3 and the optical sheet 2 disposed between the surface light source device 200 and the liquid crystal panel 1. The liquid crystal panel 1 displays an image through illumination of light emitted from the surface light source device 200 onto the back surface 1b.

The surface light source device 200 includes a thin plate-shaped diffusing plate 4, a reflecting bar 6, a laser beam guide rod 7 (a first light guide rod), an LED light guide rod 8 (a second light guide rod), a laser beam source 9 (a first light source), an LED light source 10 (a second light source), and a light reflecting portion 5 (a reflecting member).

For the sake of easy explanation, xyz rectangular coordinate systems are defined in the following manner and coordinate axes of the xyz rectangular coordinate systems are shown in each of the drawings. A long-side direction of the display surface 1a of the liquid crystal panel 1 is set to be an x-axis direction (a transverse direction in FIG. 1). A short-side direction of the display surface 1a of the liquid crystal panel 1 is set to be a y-axis direction (a perpendicular direction to the drawing sheet of FIG. 1). A perpendicular direction to an x-y plane including the x axis and the y axis is set to be a z-axis direction (a vertical direction in FIG. 1).

In FIG. 1, moreover, a direction from a side portion 53 toward a side portion 52, which is provided at a side opposite to the side portion 53, of the light reflecting portion 5 (a direction from the left toward the right of the drawing sheet) is set to be a positive direction of an x axis (a +x-axis direction). An opposite direction to the +x-axis direction is set to be a negative direction of the x axis (a −x-axis direction). In FIG. 1, moreover, a direction viewed backward from the front of the drawing sheet is set to be a positive direction of a y axis (a +y-axis direction). An opposite direction to the +y-axis direction is set to be a negative direction of the y axis (a −y-axis direction). In FIG. 1, furthermore, a direction from the diffusing plate 4 toward the liquid crystal panel 1 (a direction from a lower part toward an upper part of the drawing sheet) is set to be a positive direction of a z axis (a +z-axis direction). An opposite direction to the +z-axis direction is set to be a negative direction of the z axis (a −z-axis direction).

As shown in FIG. 1, in the liquid crystal display device 100, the liquid crystal panel 1, the optical sheet 2, the optical sheet 3, and the surface light source device 200 are disposed in order from the positive direction toward the negative direction of the z axis. The optical sheet 2 has a function for suppressing an optical influence such as fine illumination unevenness of illumination light L300. The optical sheet 3 has a function for directing the transmitted illumination light L300 toward the back surface 1b of the liquid crystal panel 1.

The liquid crystal panel 1 includes the display surface 1a, the back surface 1b, and a liquid crystal layer (not shown). The display surface 1a is provided on an end face at the +z-axis side of the liquid crystal panel 1, and the back surface 1b is provided on an end face at the −z-axis side of the liquid crystal panel 1. The liquid crystal layer is provided between the display surface 1a and the back surface 1b in the liquid crystal panel 1.

The display surface 1a of the liquid crystal panel 1 is parallel with an x-y plane. The liquid crystal layer of the liquid crystal panel 1 has a planar structure extended in a parallel direction with the x-y plane. The display surface 1a of the liquid crystal panel 1 usually takes a rectangular shape, and two adjacent sides of the display surface 1a (a long side provided in the x-axis direction and a short side provided in the y-axis direction) are orthogonal to each other. Although description will be given on the assumption that the display surface 1a of the liquid crystal panel 1 takes the rectangular shape in the present preferred embodiment, the shape of the display surface 1a of the liquid crystal panel 1 is not restricted thereto but other shapes may be taken.

As shown in FIGS. 1 and 3, the light reflecting portion 5 is formed in a box shape such that the laser beam guide rod 7, the LED light source 10, the LED light guide rod 8, and the reflecting bar 6 can be accommodated. More specifically, the light reflecting portion 5 includes a back portion 51 which is parallel with the x-y plane, four side portions 52, 53, 54 and 55, and an opening portion 56. Herein, FIG. 3 is a schematic view showing the liquid crystal display device 100 of FIG. 1 as seen from the x-axis direction side.

The side portion 52 is disposed on an end in the +x-axis direction of the back portion 51 and the side portion 53 is disposed on an end in the −x-axis direction of the back portion 51. The side portion 54 is disposed on an end in the +y-axis direction of the back portion 51 and the side portion 55 is disposed on an end in the −y-axis direction of the back portion 51. Main surfaces of the back portion 51 (inner and outer surfaces) are smaller planes than the display surface 1a of the liquid crystal panel 1. For this reason, the four side portions 52, 53, 54 and 55 are gradually tilted inward toward the back portion 51. The opening portion 56 is provided in a normal direction of the back portion 51 in such a manner that an emission side of the light reflecting portion 5 is opened.

An inner surface of the light reflecting portion 5 is a reflecting surface 57. The reflecting surface 57 has a function for reflecting and diffusing light. Herein, the inner surface of the light reflecting portion 5 is an inner surface of the box shape of the light reflecting portion 5. In other words, the reflecting surface 57 indicates a surface in the +z-axis direction of the back portion 51, a surface in the −x-axis direction of the side portion 52, a surface in the +x-axis direction of the side portion 53, a surface in the −y-axis direction of the side portion 54, and a surface in the +y-axis direction of the side portion 55. The reflecting surface 57 can be formed by disposing a light reflection sheet using a resin such as polyethylene terephthalate as a base material on the whole inner surface of the light reflecting portion 5, for example. Moreover, the reflecting surface 57 may be formed by depositing a metal onto the whole inner surface of the light reflecting portion 5.

The diffusing plate 4 is disposed on the +z-axis direction side of the light reflecting portion 5. The diffusing plate 4 is disposed in the +z-axis direction of the opening portion 56. The diffusing plate 4 is disposed to cover the opening portion 56. The light reflecting portion 5 and the diffusing plate 4 form a hollow box shape having a reflecting surface (the reflecting surface 57) and a diffusion surface (the surface in the −z-axis direction of the diffusing plate 4).

The laser beam guide rod 7 is disposed in penetration through an inner part of the hollow box shape in the x-axis direction. Herein, the x-axis direction is set to include the +x-axis direction and the −x-axis direction, and the same also applies to the y-axis direction and the z-axis direction. The LED light guide rod 8 is disposed on the −z-axis direction side from the laser beam guide rod 7 in the hollow box shape. The LED light source 10 is disposed on the surface in the +z-axis direction of the back portion 51. Moreover, the reflecting bar 6 is disposed on the +z-axis direction side from the laser beam guide rod 7 in the hollow box shape. In other words, the surface light source device 200 has such a structure as to have the reflecting bar 6, the laser beam guide rod 7, the LED light guide rod 8, and the LED light source 10 in order from the positive direction toward the negative direction of the z axis in the hollow box shape including the light reflecting portion 5 and the diffusing plate 4.

As shown in FIGS. 1 to 3, the LED light source 10, the LED light guide rod 8, the laser beam guide rod 7, and the reflecting bar 6 are disposed in the z-axis direction. Furthermore, the LED light source 10, the LED light guide rod 8, the laser beam guide rod 7, and the reflecting bar 6 disposed in the z-axis direction are provided in plural numbers in the y-axis direction.

The laser beam guide rods 7 and the LED light guide rods 8 are disposed in the y-axis direction at regular intervals. By this disposition, the laser beam guide rod 7 and the LED light guide rod 8 can be configured with a smaller number of components as compared with a light guide plate having an equivalent size to a liquid crystal display element to be used by a conventional side edge method, and a weight of the liquid crystal display device 100 according to the present preferred embodiment can be reduced as compared with the liquid crystal display device having the same size using the side edge method.

The laser beam guide rod 7 is disposed in penetration through the side portions 52 and 53. In other words, the laser beam guide rod 7 is held on the light reflecting portion 5 with ends of the laser beam guide rod 7 protruded outward. More specifically, the side portions 52 and 53 are provided with holes each having a size equal to or larger than the end in the x-axis direction of the laser beam guide rod 7. Positions of the holes in the side portions 52 and 53 through which the laser beam guide rod 7 is to be inserted are the same coordinate positions on the y-z plane. The laser beam guide rod 7 is inserted through the holes provided on the side portions 52 and 53 and is thus attached to the light reflecting portion 5. A light incident surface 71 of the laser beam guide rod 7 is disposed on the +x-axis direction side from the side portion 52. Moreover, the light incident surface 72 is disposed on the −x-axis direction side from the side portion 53. In other words, the light incident surfaces 71 and 72 are disposed on an outside of the light reflecting portion 5.

The laser beam source 9 are disposed in an opposed position to the light incident surfaces 71 and 72 in the +x-axis direction from the side portion 52 and the −x-axis direction from the side portion 53. In other words, each of the laser beam sources 9 is disposed on the outside of the light reflecting portion 5. The laser beam source 9 includes a light emitting portion (not shown). The laser beam source 9 in the +x-axis direction of the side portion 52 is disposed with the light emitting portion turned in the −x-axis direction. In other words, the laser beam source 9 emits a laser beam in the −x-axis direction.

Moreover, the laser beam source 9 in the −x-axis direction of the side portion 53 is disposed with the light emitting portion turned in the +x-axis direction. In other words, the laser beam source 9 emits a laser beam in the +x-axis direction. The laser beam sources 9 are disposed on the +x-axis side of the side portion 52 and the −x-axis side of the side portion 53, and are disposed in a line in the y-axis direction. Each of the laser beam source 9 is disposed on a rear end of the surface light source device 200. In other words, each of the laser beam sources 9 is disposed on a rear end of the liquid crystal display device 100.

In recent years, a white LED is employed as light sources of many liquid crystal display devices. The white LED generates white light having a wide spectrum from a blue color to a red color. The white LED has high light emission efficiency and is effective for reducing power consumption. For this reason, the white LED is employed widely as a light source of a backlight unit in the liquid crystal display device.

A liquid crystal display element of the liquid crystal display device includes a color filter. The liquid crystal display device takes out only respective wavelength ranges for red, green and blue colors by means of the color filter, thereby performing color representation. In the case of a light source having a continuous spectrum with a wide wavelength bandwidth like the white LED, in order to enlarge a color reproduction range, it is necessary to set a transmission wavelength band of light transmitted through the color filter to be narrow and to enhance color purity of a display color. However, the wavelength band of the light transmitted through the color filter is set to be narrow so that a quantity of unnecessary light is increased. In other words, in the liquid crystal display element, utilization efficiency of light is reduced greatly. This causes reduction in a luminance of the display surface of the liquid crystal display element. Furthermore, increase in the power consumption of the liquid crystal display device is caused.

Moreover, a person generally has a high sensitivity to a color difference of the red color. For this reason, a human visual sense feels a difference in a wavelength bandwidth of the red color as a more remarkable difference than a difference in the wavelength bandwidth of other colors. Herein, "a difference in a wavelength bandwidth" indicates a difference in color purity. The white LED to be used as the light source in the conventional liquid crystal display device particularly has a small energy quantity of a spectrum in a red color having a band of 600 nm to 700 nm. In other words, when a color filter having a narrow wavelength bandwidth is used to enhance color purity of a wavelength region of 630 nm to 640 nm which is preferable as pure red, a quantity of transmitted light is decreased so that the utilization efficiency of the light is reduced, resulting in a poorer luminance.

On the other hand, the laser beam emitting element can obtain light having a narrower wavelength bandwidth and higher color purity than those in the white LED. By using the laser beam emitting element as the light source, moreover, it is possible to prevent a loss of a light quantity from being caused by the color filter, thereby increasing the utilization efficiency of the light.

The liquid crystal display device 100 and the surface light source device 200 according to the present preferred embodiment particularly emit red light in three primary colors of light by means of the laser beam source 9 having a high monochromatism. Consequently, a remarkable effect is produced for reduction in power consumption and enhancement in color purity as compared with the case in which light having the other colors is emitted by the laser beam source. Herein, the laser beam source 9 includes a laser beam emitting element.

More specifically, the LED light source 10 is obtained by employing a blue-green LED element in a package including a monochromatic LED element for emitting blue light. The blue-green LED element is filled with a green phosphor for absorbing the blue light and emitting green light. The blue-green LED light source of a simple and small type which can be applied to a display has lower power consumption and a higher output than those in a monochromatic LED light source for emitting the green light or a laser beam source for emitting the green light.

By combining the LED light source 10 having the blue LED element and the green phosphor with the laser beam source 9 for emitting a red laser beam, therefore, it is possible to implement a liquid crystal display device having a wider color reproduction range and lower power consumption than those in the conventional art. The LED light source 10 may include a blue LED element for emitting blue light and a green LED element, for example. In the case in which the LED elements (the blue LED element and the green LED element) are employed for the LED light source 10, however, a power saving effect is poorer than that in the case in which the blue-green LED elements (the blue LED element and the green phosphor) are employed for the LED light source 10.

In a liquid crystal display device using the conventional white LED for a light source, moreover, a wavelength bandwidth of red light emitted from the white LED is greater than that of red light emitted from a laser beam emitting element. For this reason, the conventional liquid crystal display device transmits part of red light through a green filter, thereby reducing color purity of the green color. A spectrum of light transmitted through the green filter is adjacent to a spectrum of the red light. Referring to the liquid crystal display device 100 and the surface light source device 200 according to the present preferred embodiment, the color purity of the red color is increased by the use of the red laser beam source 9. Moreover, a quantity of the red light transmitted through the green filter is reduced by the use of the red laser beam source 9. For this reason, the color purity of the green color is enhanced.

As described above, it is assumed that the LED light source 10 is the LED light source for emitting the blue-green light and the laser beam source 9 is the laser beam source for emitting the red light. However, the structure according to the present invention is not restricted thereto. For example, the LED light source 10 may include an LED element for emitting green light and the laser beam source 9 may include a laser beam emitting element for emitting red color and a laser beam emitting element for emitting blue light. For example, moreover, the LED light source 10 may include an LED element for emitting red light and an LED element for emitting green light, and the laser beam source 9 may include a laser beam emitting element for emitting blue light.

In the case in which a red laser beam emitting element is employed for the laser beam source 9, it is possible to indicate a remarkable difference from the conventional liquid crystal display device in the reduction of the power consumption and the enhancement in the color purity as compared with the case in which the blue laser beam emitting element is employed.

Next, the laser beam guide rod 7 will be described. As shown in FIGS. 2 and 3, the laser beam guide rod 7 is disposed to be turned in the x-axis direction and to be arranged in a plurality of lines at a predetermined interval in the y-axis direction. In each of the laser beam guide rods 7, both end faces in a longitudinal direction are light incident surfaces 71 and 72 (first light incident surfaces). The laser beam sources 9 (more specifically, the light emitting portions of the laser beam sources 9) are disposed at opposed positions to the light incident surfaces 71 and 72, respectively. A laser beam L90 (first light) emitted from the laser beam source 9 toward the light incident surfaces 71 and 72 of the laser beam guide rod 7 is incident on the inner part of the laser beam guide rod 7 from the light incident surfaces 71 and 72.

The laser beam L90 is totally reflected on an interface between the laser beam guide rod 7 and an air layer, and at the same time, is propagated toward a light incident surface at an opposite side to the light incident surface for incidence. In other words, in FIG. 1, the laser beam L90 incident from the light incident surface 72 on the −x-axis side of the laser beam guide rod 7 travels in the +x-axis direction in the inner part of the laser beam guide rod 7. Moreover, the laser beam L90 incident from the light incident surface 71 on the +x-axis side of the laser beam guide rod 7 travels in the −x-axis direction in the inner part of the laser beam guide rod 7.

The laser beam guide rod 7 is made of a transparent material and a substance (a diffusing material) having a higher refractive index than that of the transparent material, for example. Moreover, the laser beam guide rod 7 is a cylindrical bar-shaped member having a diameter of approximately 3 mm, for example. The laser beam L90 is totally reflected on the interface between the laser beam guide rod 7 and the air layer, and at the same time, is propagated in the inner part of the laser beam guide rod 7. When the laser beam L90 is incident on the diffusing material, however, the laser beam L90 is diffused and reflected by the diffusing material and thus changes its traveling direction. When the traveling direction of the laser beam L90 is changed, some laser beams L90 cannot satisfy a totally reflecting condition on the interface between the front surface of the laser beam guide rod 7 and the air layer. The laser beam L90 which does not satisfy the totally reflecting condition is emitted from the laser beam guide rod 7 in various directions.

In the laser beam guide rod 7, a concentration of the diffusing material contained in the transparent material is adjusted to obtain linear light having uniform intensity distribution in the x-axis direction of the laser beam L90 emitted from the laser beam guide rod 7. Herein, an acrylic resin (Polymethyl methacrylate: PMMA) or the like is employed for the transparent material, for example. The laser beam L90 is converted into linear light (first linear light) extended in the x-axis direction by the laser beam guide rod 7.

Figure 5:
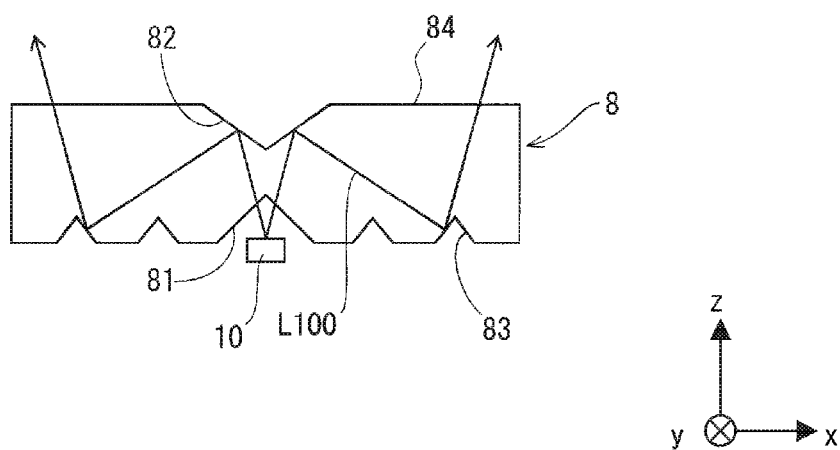
FIG. 5 is a schematic view schematically showing a structure of an LED light guide rod.

Next, the LED light guide rod 8 will be described with reference to FIGS. 1, 3 and 5. FIG. 5 is a schematic view schematically showing a structure of the LED light guide rod 8. The LED light guide rod 8 is made of a transparent material such as an acrylic resin (PMMA) and a substance (a diffusing material) having a higher refractive index than that of the transparent material, for example. Moreover, the LED light guide rod 8 is shaped to include a light incident surface 81 (a second light incident surface), a reflecting surface 82, a microstructure 83, and an emitting surface 84 on a prismatic bar of approximately 5 mm square, for example.

The LED light guide rod 8 is disposed in a close position to the −z-axis direction from the laser beam guide rod 7. More specifically, the LED light guide rod 8 is disposed to be turned in the x-axis direction and to be arranged in a plurality of lines at a predetermined interval in the y-axis direction. Moreover, three LED light guide rods 8 are disposed at predetermined intervals in the x-axis direction with respect to the laser beam guide rods 7.

The light incident surface 81 is a surface formed along a transverse direction (the y-axis direction) of each of the LED light guide rods 8 at an opposite side to the emitting side of the light reflecting portion 5. More specifically, the light incident surface 81 is provided on a surface at the −z-axis direction side of the LED light guide rod 8. Similarly, the microstructure 83 is also provided on a surface at the −z-axis direction side of the LED light guide rod 8. Moreover, the reflecting surface 82 and the emitting surface 84 are provided on the surface at the +z-axis direction side of the LED light guide rod 8.

The LED light source 10 is disposed in the −z-axis direction from the LED light guide rod 8 on the back portion 51 of the light reflecting portion 5. The LED light source 10 (more specifically, the light emitting portion of the LED light source 10) is disposed in a close position to the −z-axis direction of the light incident surface 81 of the LED light guide rod 8. An LED light L100 incident from the light incident surface 81 of the LED light guide rod 8 is propagated in the +z-axis direction and is divided into light propagated in the +x-axis direction and the −x-axis direction through the reflecting surface 82.

The LED light L100 is totally reflected on the interface between the LED light guide rod 8 and the air layer, and at the same time, is propagated in the +x-axis direction or the −x-axis direction. Some light traveling in the +x-axis direction or the −x-axis direction which is incident on the microstructure 83 changes its traveling direction. When the traveling direction of the LED light L100 is changed, some LED light cannot satisfy a totally reflecting condition on the interface between the front surface of the LED light guide rod 8 and the air layer. The LED light L100 (light traveling in the +z-axis direction) which does not satisfy the totally reflecting condition is emitted from the emitting surface 84 of the LED light guide rod 8 in the +z-axis direction.

The light incident surface 81 and the reflecting surface 82 in the LED light guide rod 8 have a structure for dividing the LED light L100 into light propagated in the +x-axis direction and the −x-axis direction in the LED light guide rod 8. Moreover, a shape, an arrangement position, and an arrangement density of the microstructure 83 are determined in such a manner that the light emitted from the emitting surface 84 is changed into linear light having uniform intensity distribution in the x-axis direction. For example, the shapes of the light incident surface 81, the reflecting surface 82, and the microstructure 83 have a prism structure extended in the y-axis direction. The LED light L100 is converted into linear light (second linear light) extended in the x-axis direction by the LED light guide rod 8. The shapes of the light incident surface 81, the reflecting surface 82, and the microstructure 83 are not restricted to the prism structure, but may take such shapes as to enable performance of the functions described above.

Figure 6:
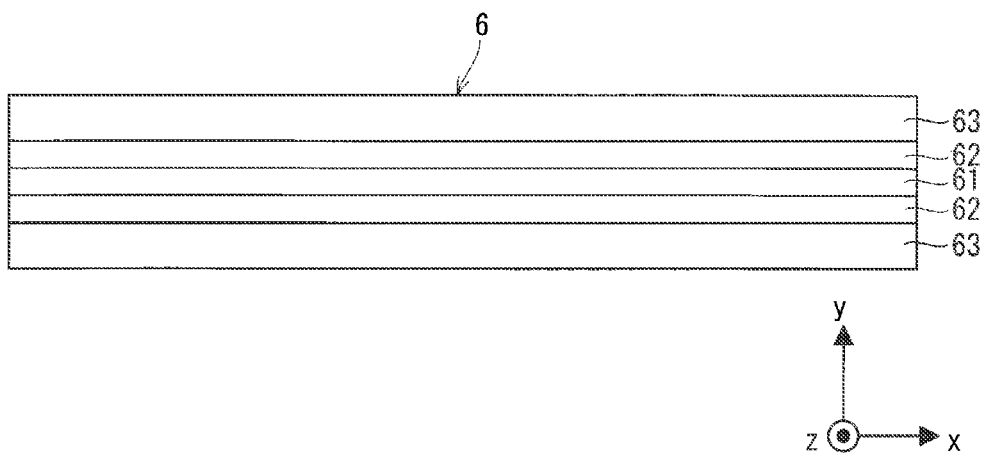
FIG. 6 is a configuration view schematically showing an example of a reflecting bar.

The laser beam L90 emitted in the +z-axis direction from the laser beam guide rod 7 and the LED light L100 emitted in the +z-axis direction from the emitting surface 84 of the LED light guide rod 8 reach the reflecting bar 6. As shown in FIG. 6, the reflecting bar 6 has a reflecting portion 61, a diffusion reflecting portion 62, and a reflecting portion 63 from a central part toward an end in the y-axis direction. FIG. 6 is a configuration view schematically showing an example of the reflecting bar 6. The reflecting bar 6 has a width (the y-axis direction) of 25 mm and takes a shape of a strip extended in the x-axis direction, for example. The laser beam L90 and the LED light L100 reaching a back surface of the reflecting bar 6 are reflected or diffused and reflected (diffusion and reflection) depending on a position for abutment on the reflecting bar 6.

Figure 8A:
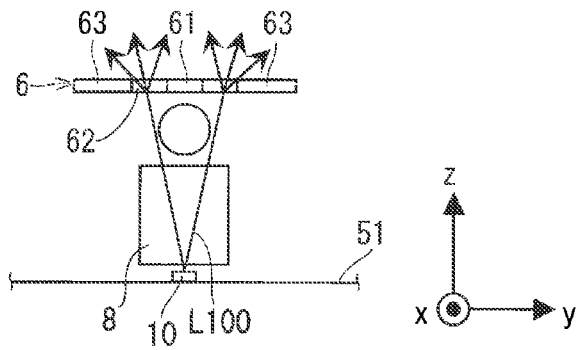
FIGS. 8A and 8B are configuration views schematically showing a function of a diffusion reflecting portion of the reflecting bar.
Figure 8B:
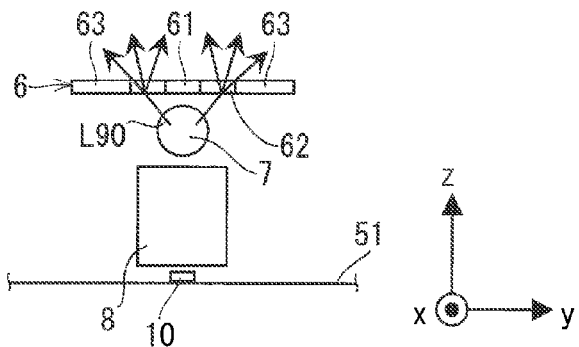

As shown in FIGS. 7A and 7B, the laser beam L90 and the LED light L100 reaching the reflecting portion 61 of the reflecting bar 6 are reflected in the −z-axis direction. The laser beam L90 and the LED light L100 traveling in the −z-axis direction reach the back portion 51 of the light reflecting portion 5, and are diffused and reflected to thus spread in the y-axis direction. As shown in FIGS. 8A and 8B, moreover, the laser beam L90 and the LED light L100 reaching the diffusion reflecting portion 62 of the reflecting bar 6 are diffused by diffusing regions 64 (see FIG. 9) and thus spread and travel in the z-axis direction. Herein, FIGS. 7A and 7B are configuration views schematically showing the function of the reflecting portion 61 of the reflecting bar 6, and FIGS. 8A and 8B are configuration views schematically showing the function of the diffusion reflecting portion 62 of the reflecting bar 6.

The laser beam L90 and the LED light L100 spread in the y-axis direction by means of the reflecting bar 6. Consequently, the laser beam L90 and the LED light L100 spatially overlap the light emitted from the laser beam guide rod 7 and the LED light guide rod 8 which are adjacent to each other so that planar light for illuminating the back surface 1*b* of the liquid crystal panel 1 is obtained.

The reflecting portions 61 and 63 of the reflecting bar 6 are disposed on the central part and both ends in the short direction (the y-axis direction) of the reflecting bar 6. Moreover, the diffusion reflecting portion 62 is disposed close to the reflecting portion 61 in the central part so as to be x-axis symmetrical with respect to the center in the short direction of the reflecting bar 6. More specifically, the diffusion reflecting portion 62 is disposed between the reflecting portion 61 and the reflecting portion 63. The light reflected by the reflecting bar 6 is diffused and reflected by the back portion 51 and thus spreads in the y-axis direction.

If all of the light reaching the reflecting bar 6 is reflected, however, a position corresponding to the reflecting bar 6 on the diffusing plate 4 is darkened. In other words, the position corresponding to the reflecting bar 6 is darkened so that an intensity distribution difference between light and darkness is generated in the display surface 1*a*. In the present preferred embodiment, therefore, the diffusion reflecting portion 62 for diffusing and reflecting light is provided in a part of the reflecting bar 6. Part of the light reaching the back surface (the −z side) of the reflecting bar 6 is diffused by the diffusion reflecting portion 62 and illuminates an upper side of the reflecting bar 6.

The reflecting portion 61 of the reflecting bar 6 is formed in a width of 2 mm in the y-axis direction, for example. The reflecting portion 61 serves to reflect light. The reflecting bar 6 is disposed in the z-axis direction in close proximity to the laser beam guide rod 7 and the LED light guide rod 8. Moreover, the reflecting bar 6 is disposed with a center in the y-axis direction aligned with laser beam guide rod 7 and the LED light guide rod 8. For this reason, most of light emitted from the respective guide rods and reaching the back side of the reflecting bar 6 reaches the central part in the short direction of the reflecting bar 6 before it greatly spreads at its own divergence angle. By providing the reflecting portion 61 on the central part in the short direction of the reflecting bar 6, it is possible to reflect and expand much light in the y-axis direction.

Figure 9:
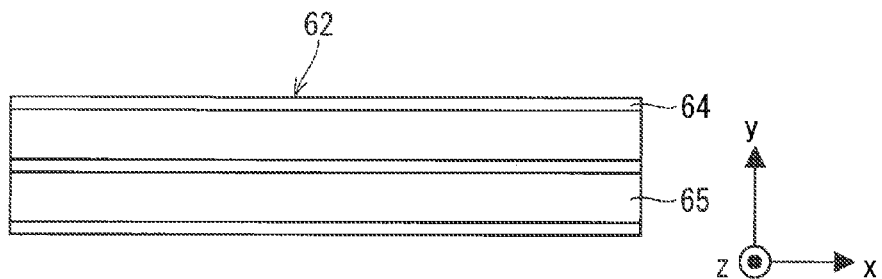
FIG. 9 is a configuration view schematically showing an example of the diffusion reflecting portion of the reflecting bar.

The diffusion reflecting portions 62 of the reflecting bar 6 are provided in contact with the end faces in the +y direction and the −y direction of the reflecting portion 61, and are a region with a width of 2 mm in the y-axis direction. As shown in FIG. 9, the diffusion reflecting portion 62 includes the diffusing regions 64 for diffusing part of the light incident on the diffusion reflecting portion 62 and reflecting regions 65 for reflecting the residual part of the light. FIG.

9 is a configuration view schematically showing an example of the diffusion reflecting portion 62 of the reflecting bar 6. The diffusing regions 64 are present at a constant rate with respect to the whole diffusion reflecting portion 62, and the residual part is the reflecting regions 65. Herein, a rate of the diffusing regions 64 to the whole diffusion reflecting portion 62 is set to be a diffusion ratio. The light is diffused corresponding to the diffusion ratio and the diffusion ratio is set to obtain uniform planar light on the display surface. If the diffusion ratio is too high or low, light/darkness unevenness is visually recognized in the display surface 1a.

The diffusing regions 64 are formed like a slit extended in the x-axis direction on the central part and both ends in the short direction of the diffusion reflecting portion 62. The reflecting regions 65 are formed between the central part and the both ends in the short direction of the diffusion reflecting portion 62, that is, in a region excluding the diffusing regions 64 in the diffusion reflecting portion 62.

The light diffused by the diffusing regions 64 of the diffusion reflecting portion 62 spreads, and at the same time, travels toward the diffusing plate 4. At this time, the light diffused by the diffusing regions 64 is changed to light for illuminating the diffusing plate 4 on the upper side of the reflecting bar 6. Herein, although the description has been given on the assumption that the diffusion reflecting portion 62 is a strip having a width of 2 mm, the present invention is not restricted thereto. In other words, it is necessary to set the diffusion reflecting portion 62 into such a position and width that the light diffused by the diffusing regions 64 can illuminate the upper side of the reflecting bar 6, particularly a position corresponding to the central part of the reflecting bar 6 in the diffusing plate 4. In a position spaced apart from the central part of the reflecting bar 6 in the y-axis direction, an intensity of the light being emitted from each of the light guide rods and reaching the reflecting bar 6 is reduced. For this reason, an intensity of the light illuminating the position corresponding to the reflecting bar 6 in the diffusing plate 4 is reduced. In the position spaced apart from the central part of the reflecting bar 6 in the y-axis direction, moreover, an angle of the light reaching the reflecting bar 6 is tilted greatly in the y-axis direction. Even if the light is diffused by the diffusing regions 64, therefore, the intensity of the light illuminating the position corresponding to the reflecting bar 6 in the diffusing plate 4 is reduced.

The reflecting portion 63 of the reflecting bar 6 is provided in a region reaching the end in the short direction of the reflecting bar 6 from the diffusion reflecting portion 62. The reflecting portion 63 plays the same role as the reflecting portion 61.

It is desirable to use a member having a high reflectance like a light reflecting sheet in the reflecting portions 61 and 63 of the reflecting bar 6 and the reflecting regions 65 of the diffusion reflecting portion 62. Furthermore, it is desirable to use a diffusing sheet in the diffusing regions 64 of the diffusion reflecting portion 62. Referring to the reflecting bar 6, for example, the light reflecting sheet having the same size as the reflecting bar 6 can be fabricated in a combination of a part cut out of a portion provided with the diffusing regions 64 and a strip-shaped diffusing sheet. Moreover, the diffusing sheet having the same size as the reflecting bar 6 can also be implemented by applying an ink having a function for diffusing and reflecting or regularly reflecting a region other than the diffusing regions 64, for example. Furthermore, a reflecting member such as a mirror may be used in the reflecting portions 61 and 63 and the reflecting regions 65 of the diffusion reflecting portion 62.

By using the diffusing sheet in the diffusing regions 64, it is possible to scatter the light passing through the diffusion reflecting portion 62 and directly traveling toward the diffusing plate 4 in various directions. For this reason, a color mixing property is increased so that occurrence of color irregularity can be prevented. By using the diffusing sheet, furthermore, it is possible to suppress intensity unevenness unevenness in the x-axis direction of each linear light.

In the present preferred embodiment, the laser beam L90 and the LED light L100 reflected by the reflecting bar 6 are diffused and reflected by the back portion 51 and thus spread in the y-axis direction. By the spread of the light in the y-axis direction through the reflecting bar 6, it is possible to dispose the laser beam guide rod 7 and the LED light guide rod 8 at regular intervals in the y-axis direction also at a short projection distance. Herein, the projection distance indicates a distance in the z-axis direction from the back portion 51 to the diffusing plate 4.

For example, in the case in which the reflecting bar 6 is not provided, much light emitted from the laser beam guide rod 7 and the LED light guide rod 8 travels toward the diffusing plate 4. For this reason, it is necessary to set small arrangement intervals between the adjacent laser beam guide rods 7 and the adjacent LED light guide rods 8 in order to make uniform intensity distribution in the y-axis direction over the display surface at the short projection distance. By setting these small arrangement intervals, it is possible to shorten a propagation distance until the light emitted from each of the light guide rods is mixed with the light emitted from the adjacent light guide rod. In other words, by disposing the laser beam guide rod 7 and the LED light guide rod 8 at the small interval in the y-axis direction, uniform intensity distribution can be obtained even if the projection distance is short.

However, the arrangement of the laser beam guide rod 7 and the LED light guide rod 8 at the small interval causes increase in the number of components and increase in the weight of the liquid crystal display device 100. In the present preferred embodiment, the light emitted from the laser beam guide rod 7 and the light emitted from the LED light guide rod 8 are extended in the y-axis direction by means of the reflecting bar 6 so that the numbers of the laser beam guide rods 7 and the LED light guide rods 8 are decreased and the uniform intensity distribution is implemented in the y-axis direction at the short projection distance. Furthermore, the reflecting bar 6 is made of a thin and light member like a diffusing sheet or a reflecting sheet. For this reason, the weight is less increased by the addition of the reflecting bar 6. By minimizing the numbers of the laser beam guide rods 7 and the LED light guide bars 8, therefore, it is possible to reduce the weight of the liquid crystal display device 100.

Figure 10:
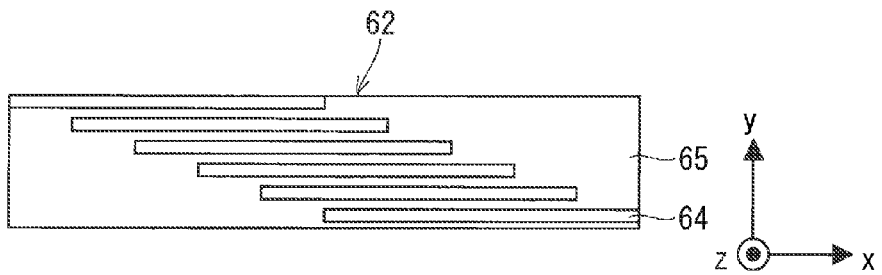
FIG. 10 is a configuration view schematically showing a first modification example of the diffusion reflecting portion of the reflecting bar.

Next, modification examples of the first preferred embodiment will be described. FIG. 10 is a configuration view schematically showing a first modification example of the diffusion reflecting portion 62 of the reflecting bar 6, FIG. 11 is a configuration view schematically showing a second modification example of the diffusion reflecting portion 62 of the reflecting bar 6, and FIG. 12 is a configuration view schematically showing a third modification example of the diffusion reflecting portion 62 of the reflecting bar 6.

As described above, it is assumed that the diffusing regions 64 of the diffusion reflecting portion 62 are formed like a slit extended in the x-axis direction. However, the shape of the diffusing regions 64 is not restricted thereto. For example, as shown in FIG. 10, the diffusing regions 64 may be repeated at a regular interval in the y-axis direction.

Figure 11:
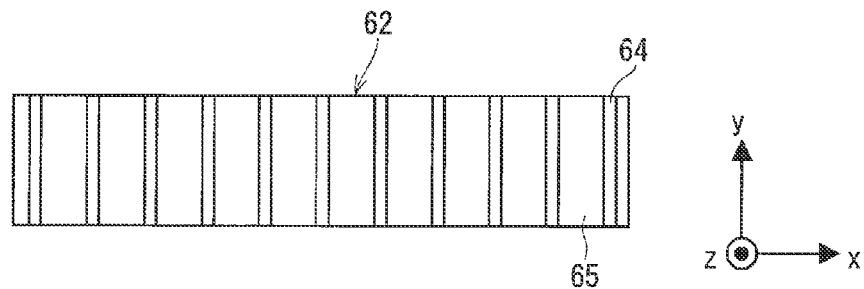
FIG. 11 is a configuration view schematically showing a second modification example of the diffusion reflecting portion of the reflecting bar.

Moreover, the diffusing regions 64 may be formed like a slit extended in the y-axis direction and repeated at a regular interval in the x-axis direction as shown in FIG. 11, for example.

Figure 12:
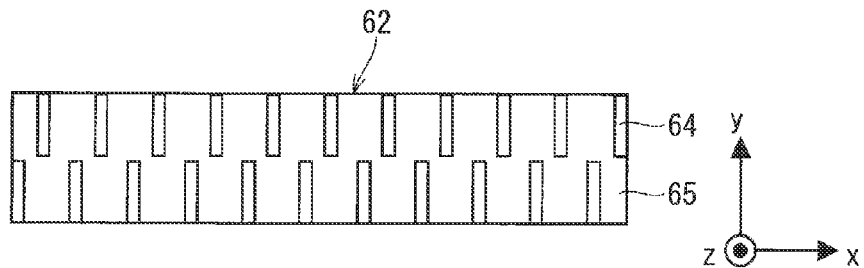
FIG. 12 is a configuration view schematically showing a third modification example of the diffusion reflecting portion of the reflecting bar.

Furthermore, the diffusing regions 64 may be disposed to be repeated at a regular interval in the x-y plane of the diffusion reflecting portion 62 as shown in FIG. 12, for example. Moreover, an optional shape such as a square shape or a round shape can be employed as the shape of the diffusing regions 64 in addition to the rectangular shape shown in FIGS. 9 to 12. In order for the light diffused by the diffusing regions 64 to spread in various directions to obtain uniform distribution, however, it is preferable to repeat a fine shape as the shape of the diffusing regions 64.

Figure 4:
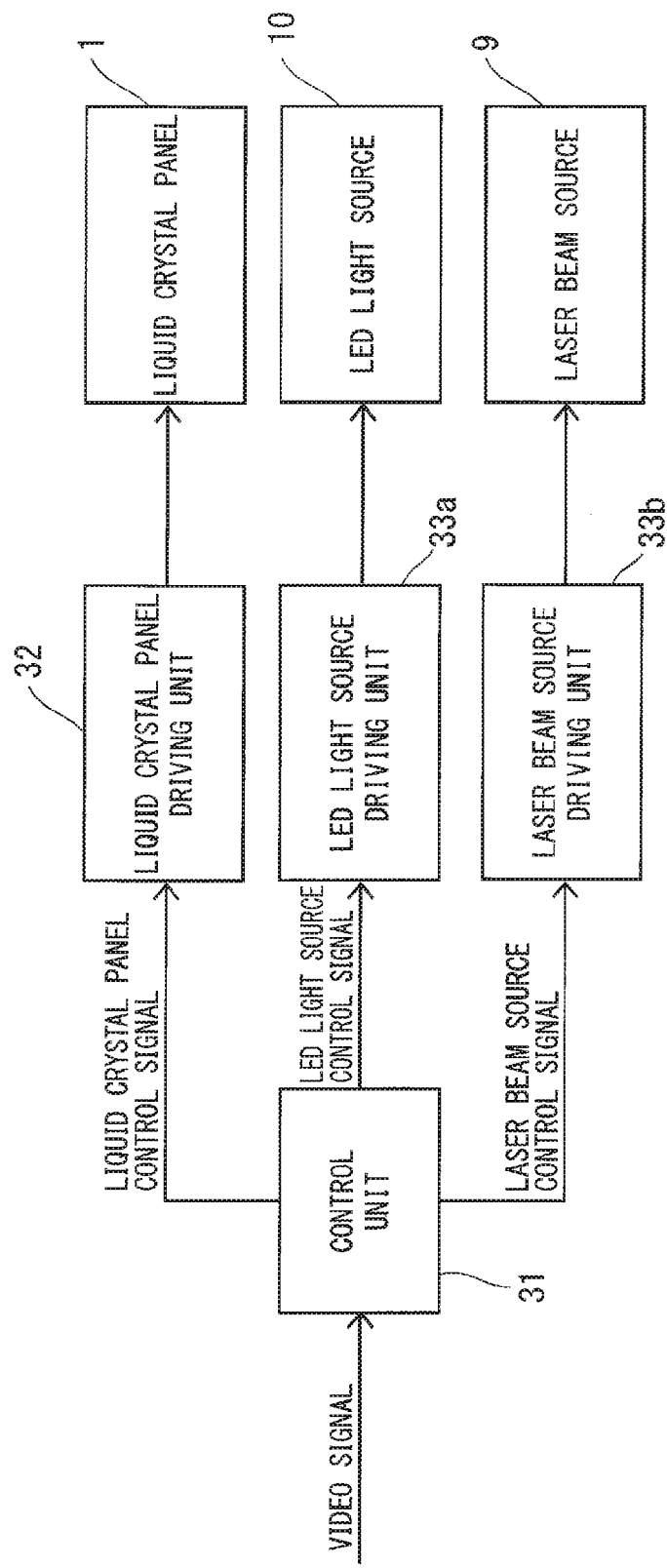
FIG. 4 is a block diagram showing the liquid crystal display device.

Next, a control system of the liquid crystal display device 100 will be described with reference to FIG. 4. FIG. 4 is a block diagram showing the liquid crystal display device 100. By individually controlling a quantity of light emission of the LED light source 10 and a quantity of light emission of the laser beam source 9, it is possible to reduce power consumption. The liquid crystal panel driving unit 32 drives the liquid crystal panel 1. The LED light source driving unit 33a drives the LED light source 10. The laser beam source driving unit 33b drives the laser beam source 9. The control unit 31 controls the liquid crystal panel driving unit 32, the LED light source driving unit 33a, and the laser beam source driving unit 33b.

For example, the control unit 31 individually controls the LED light source driving unit 33a and the laser beam source driving unit 33b, thereby enabling regulation of a rate of a quantity of blue-green light emitted from the LED light source 10 and a quantity of red light emitted from the laser beam source 9. A rate of light intensities of necessary respective colors is varied in response to a video signal input to the control unit 31. By regulating a quantity of light emission from each light source corresponding to the video signal, it is possible to implement reduction in the power consumption.

The LED element and the laser beam emitting element are light sources having different characteristics from each other. In particular, the LED element and the laser beam emitting element have divergence angles of emitted light (angle intensity distribution) which are greatly different from each other. Specifically, the LED light has a greater divergence angle than that of a laser beam. In other words, the laser beam has a smaller divergence angle and a higher straightness than those of the LED light. For this reason, the laser beam L90 can be incident on the laser beam guide rod 7 with a small loss in the incidence on the laser beam guide rod 7. In the present preferred embodiment, the laser beam source 9 and the light incident surfaces 71 and 72 of the laser beam guide rod 7 are disposed on the outside of the light reflecting portion 5. However, the laser beam having the small divergence angle can be incident on the laser beam guide rod 7 with a small loss. Therefore, much light can be used for display.

Moreover, the LED element and the laser beam emitting element have different light emission efficiencies for heat (temperature) from each other. In particular, the laser beam emitting element has an emission light quantity and a wavelength which are easily varied depending on the temperature. For this reason, in the case in which the LED element and the laser beam emitting element are similarly disposed side by side on the back surface side of the display surface as in a general directly under type liquid crystal display device, for example, it is difficult to separate heat generated from the LED element. Thus, the heat generated by the LED element influences the light emission of the laser beam emitting element. Accordingly, it is desirable that a heat source should not be disposed close to the laser beam emitting element. In the present preferred embodiment, the LED light source 10 is disposed on the inside of the back portion 51 of the light reflecting portion 5 and the laser beam source 9 is disposed on the outside of the side portions 52 and 53 of the light reflecting portion 5. Thus, the LED light source 10 and the laser beam source 9 are disposed apart from each other, thereby obtaining a structure in which the LED light source 10 and the laser beam source 9 are less likely to be influenced by the mutual heat.

As the laser beam source 9, for example, a semiconductor laser is employed. The semiconductor laser has a fast axis direction having a great divergence angle and a slow axis direction having a small divergence angle based on a structure thereof. The slow axis direction is orthogonal to the fast axis direction. In an array of the laser beam source 9 according to the present preferred embodiment, the fast axis direction is parallel with an array direction (the y-axis direction) of the laser beam emitting element. Moreover, the slow axis direction is parallel with a thickness direction (the z-axis direction) of the liquid crystal display device 100.

The laser beam source 9 is disposed in such a manner that the fast axis direction is parallel with the array direction (the y-axis direction) of the laser beam emitting element. Consequently, the laser beam L90 emitted from the laser beam guide rod 7 spreads still largely in the y-axis direction. For this reason, the laser beam L90 emitted from the laser beam guide rod 7 is easily mixed with the laser beam L90 emitted from the adjacent laser beam guide rod 7 in the light reflecting portion 5. Moreover, the laser beam source 9 is disposed in such a manner that the fast axis direction is parallel with the array direction (the y-axis direction) of the laser beam emitting element. Consequently, a thickness of the light reflecting portion 5 (the z-axis direction) can also be reduced. However, the arrangement direction of the laser beam emitting element is not restricted thereto.

Moreover, the laser beam guide rod 7 is set to be a cylindrical bar-shaped member having a diameter of approximately 3 mm. However, the present invention is not restricted thereto. For example, it is also possible to use a prism-shaped member having a square end face. Moreover, it is also possible to use a bar-shaped member having a rectangular or elliptical end face. In the case in which the end face takes a rectangular or elliptical shape, however, it is desirable that a long side of a rectangle and a major axis of an ellipse should be disposed in parallel with the fast axis direction of the laser beam emitting element.

Moreover, the LED light guide rod 8 is set to be a prism-shaped bar of approximately 5 mm square. However, the present invention is not restricted thereto. It is sufficient that the LED light guide rod 8 is a member having a function for converting the LED light L100 emitted from the LED light source 10 disposed on the back portion 51 into linear light extended in the x-axis direction.

Furthermore, there is employed a structure in which the light reflecting portion 5 is tilted with respect to the back portion 51 which is parallel with the x-y plane and the side portions 52, 53, 54 and 55 are tilted with respect to the x-y plane. By such a structure, the laser beam L90 and the LED light L100 incident on the tilted side portions 52, 53, 54 and 55 are reflected in the +z-axis direction. Therefore, a peripheral part of the display surface 1a of the liquid crystal panel 1 can be bright. By providing the tilted side portions 52 and 53, moreover, it is possible to dispose the laser beam source 9 on the back surface side (the −z-axis direction side) of the diffusing plate 4 as shown in FIG. 1. Consequently, a bezel can be narrowed.

Herein, the disposition of the laser beam source 9 on the back surface side of the diffusing plate 4 implies that the laser beam source 9 is not protruded outward from the end face in the x-axis direction of the diffusing plate 4. Alternatively, it is indicated that the laser beam source 9 is only partially protruded outward from the end face in the x-axis direction of the diffusing plate 4.

In the present preferred embodiment, the description has been given on the assumption that the LED light source 10 includes an LED element for emitting blue-green light and the laser beam source 9 includes a laser beam emitting element for emitting red light. However, the structure according to the present invention is not restricted thereto. For example, the LED light source 10 may include an LED element for emitting green light and the laser beam source 9 may include a laser beam emitting element for emitting red light and a laser beam emitting element for emitting blue light. Furthermore, the LED light source 10 may include an LED element for emitting red light and an LED element for emitting green light, and the laser beam source 9 may include a laser beam emitting element for emitting blue light, for example.

In the case in which a red laser beam emitting element is employed as the laser beam source 9, it is possible to indicate a remarkable difference from the conventional liquid crystal display device in reduction in power consumption and enhancement in color purity as compared with the case in which a blue laser beam emitting element is employed.

As described above, in the surface light source device 200 according to the first preferred embodiment, the laser beam L90 emitted from the laser beam source 9 is converted into linear light by the laser beam guide rod 7 and the LED light L100 emitted from the LED light source 10 is converted into linear light extended in the same direction as the linear light obtained by converting the laser beam L90 through the LED light guide rod 8. Part of the linear light obtained by converting the laser beam L90 and part of the linear light obtained by converting the LED light L100 are reflected by the reflecting portions 61 and 63 of the reflecting bar 6 and thus spread. Therefore, illumination light in uniform planar distribution can be obtained. Moreover, part of the linear light obtained by converting the laser beam L90 and part of the linear light obtained by converting the LED light L100 are reflected by the reflecting portions 61 and 63 of the reflecting bar 6, and spread with color mixture in the light reflecting portion 5. For this reason, it is possible to prevent color unevenness from being caused by a difference in the intensity distribution between the laser beam L90 and the LED light L100.

Moreover, the residual part of the linear light emitted from the laser beam guide rod 7 and the residual part of the linear light emitted from the LED light guide rod 8 are diffused and reflected by the diffusion reflecting portion 62 of the reflecting bar 6. Therefore, it is possible to scatter first linear light and second linear light directed toward the opening portion 56 in various directions. Consequently, it is possible to suppress occurrence of color unevenness by causing increase in a color mixing property still more.

When simultaneously using two types of light sources having different light emission characteristics from each other, thus, it is possible to guide the light emitted from the laser beam source 9 and the LED light source 10 without waste. Therefore, the utilization efficiency of the light can be increased so that an image of high quality can be displayed. Moreover, the display of the image of high quality can be implemented with a simple structure.

The liquid crystal display device 100 includes the surface light source device 200 and the liquid crystal panel 1 for displaying an image by illumination of light from the surface light source device 200. When simultaneously employing two types of light sources having different light emission characteristics, therefore, it is possible to guide the light emitted from the laser beam source 9 and the LED light source 10 without waste. Consequently, the utilization efficiency of the light can be increased so that the image of high quality can be displayed. Moreover, it is possible to implement the display of the image of high quality with a simple structure.

The reflecting bar 6 is formed like a strip extended in the same direction as the longitudinal direction of the laser beam guide rod 7, the reflecting portion 61 is disposed on the central part in the short direction of the reflecting bar 6, and the reflecting portions 63 are disposed on the both ends in the short direction of the reflecting bar 6. The diffusion reflecting portions 62 are provided between the reflecting portion 61 disposed on the central part in the short direction and the reflecting portions 63 disposed on the both ends in the short direction in the reflecting bar 6. Accordingly, it is possible to increase an intensity of light illuminating a position corresponding to the reflecting bar 6 in the diffusing plate 4.

The diffusion reflecting portion 62 has the diffusing regions 64 for diffusing the part of the linear light emitted from the laser beam guide rod 7 and the LED light guide rod 8 which are received by the diffusion reflecting portion 62, and the reflecting regions 65 for reflecting the residual part thereof, and the linear light emitted from the laser beam guide rod 7 and the linear light emitted from the LED light guide rod 8 are diffused depending on a diffusion ratio to be the rate of the diffusing regions 64 to the whole diffusion reflecting portion 62.

By regulating the diffusion ratio of the diffusion reflecting portion 62, accordingly, it is possible to make uniform planar light in the display surface 1a of the liquid crystal panel 1. Thus, light/darkness unevenness can be suppressed.

Moreover, the laser beam source is employed as the first light source. The laser beam source has a narrower wavelength bandwidth than that of the white LED light source and can give light having high color purity. Therefore, it is possible to obtain a wider color reproduction range than the surface light source device including the conventional white LED light source. Moreover, the laser beam source is employed as the first light source. Therefore, it is possible to suppress a loss of a light quantity in a color filter, thereby enhancing the utilization efficiency of the light.

Furthermore, the LED light source is employed as the second light source. In the case in which the blue-green LED light source is employed, it is possible to obtain lower power consumption and a higher output than those in a monochromatic LED light source for emitting green light or a laser beam source for emitting the green light. Consequently, it is possible to reduce energy consumption quantities in the surface light source device 200 and the liquid crystal display device 100.

The laser beam guide rod 7 is held on the light reflecting portion 5 with the ends of the laser beam guide rod 7 protruded outward, the laser beam source 9 and the light incident surfaces 71 and 72 are disposed on the outside of the light reflecting portion 5, and the LED light source 10 and the LED light guide rod 8 are disposed on the inside of the light reflecting portion 5. Thus, the LED light source 10 and the laser beam source 9 are disposed apart from each other, thereby obtaining a structure in which the LED light source 10 and the laser beam source 9 are less likely to be influenced by the mutual heat.

The laser beam guide rod 7 is made of a transparent material and a diffusing material having a higher refractive index than that of the transparent material, and diffuses, reflects and emits the incident laser beam L90. Therefore, the incident laser beam L90 spreads in the longitudinal direction (the x-axis direction) of the laser beam guide rod 7 so that the laser beam L90 can be converted into linear light extended in the x-axis direction.

The laser beam guide rod 7 is disposed on the opening portion 56 side from the LED light guide rod 8, and the reflecting bar 6 is disposed on the opening portion 56 side from the laser beam guide rod 7. For this reason, part of the linear light emitted from the laser beam guide rod 7 and part of the linear light emitted from the LED light guide rod 8 are reflected toward the reflecting surface 57 on the inside of the light reflecting portion 5 by the reflecting portion 61 of the reflecting bar 6. Consequently, the linear light emitted from the laser beam guide rod 7 and the linear light emitted from the LED light guide rod 8 overlap with each other and can be thus converted into planar light for illuminating the back surface 1b of the liquid crystal panel 1.

The laser beam guide rods 7 and the LED light guide rods 8 have widths of approximately 5 mm and are disposed at intervals. Therefore, it is possible to reduce the weight more greatly as compared with a side edge method using a light guide (acrylic plate) having an equivalent size to a screen size. Moreover, light is extended in the y-axis direction by means of the reflecting bar 6. For this reason, even if the respective light guide rods are disposed apart from each other to some degree, uniform intensity distribution can be obtained. Therefore, the numbers of the laser beam guide rods 7 and the LED light guide rods 8 are minimized and the weights of the surface light source device 200 and the liquid crystal display device 100 can be reduced.

Second Preferred Embodiment

Figure 13:
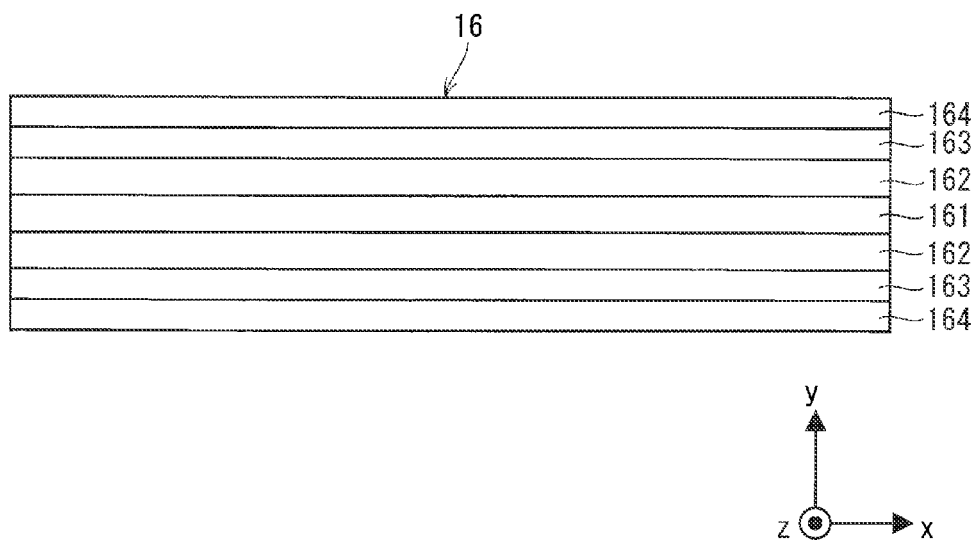
FIG. 13 is a configuration view schematically showing an example of a reflecting bar of a surface light source device according to a second preferred embodiment.

Next, a liquid crystal display device and a surface light source device according to a second preferred embodiment will be described. FIG. 13 is a configuration view schematically showing an example of a reflecting bar 16 of the surface light source device according to the second preferred embodiment. In the second preferred embodiment, explanation of the same components as those described in the first preferred embodiment will be omitted.

In the second preferred embodiment, a structure of the reflecting bar 16 is different from that of the reflecting bar 6 according to the first preferred embodiment. The reflecting bar 16 has a reflecting portion 161, a diffusion reflecting portion 162, a reflecting portion 163, and a diffusion reflecting portion 164 provided in order from a central part to an end in a short direction. The reflecting portion 161, the diffusion reflecting portion 162, and the reflecting portion 163 have the same functions as the reflecting portions 61 and 63 and the diffusion reflecting portion 62 according to the first preferred embodiment, respectively.

In other words, the reflecting portion 161 is positioned in the central part in the short direction of the reflecting bar 16 and has a function for reflecting light. The diffusion reflecting portion 162 has a diffusing region for diffusing light and a reflecting region for reflecting the light, and has a function for diffusing and extending light reaching the diffusing region in the traveling direction of the light. The reflecting portion 163 has the same function as the reflecting portion 161.

The diffusion reflecting portions 164 are provided on an outside in a y-axis direction of the reflecting portion 163 (that is, both ends in the short direction of the reflecting bar 16). In the reflecting bar 6 according to the first preferred embodiment, the reflecting portion 61 for reflecting light is present on the end. In this case, light/darkness in a position corresponding to the vicinity of the end of the reflecting bar 6 is remarkable on the diffusing plate 4 in some cases. The reason is as follows. Light is reflected by the reflecting portions 61 and 63 of the reflecting bar 6. Although a small quantity of light directly travels to the diffusing plate 4 through an upper side of the reflecting bar 6, therefore, light passing through an exact side of the reflecting bar 6, that is, light which does not hit the reflecting portions 61 and 63 directly travels toward the diffusing plate 4. Consequently, a remarkable light intensity difference is generated in the position corresponding to the vicinity of the end of the reflecting bar 6 in the diffusing plate 4.

In the second preferred embodiment, the diffusion reflecting portions 164 are provided on both ends in the short direction of the reflecting bar 16 in order to eliminate the light intensity difference on the end of the diffusing plate 4 described above. Each of the diffusion reflecting portions 164 includes a diffusing region for diffusing light and a reflecting region for reflecting light in the same manner as the diffusion reflecting portion 62. It is desirable that a diffusion ratio of the diffusion reflecting portion 164 should be set to be equal to or higher than that of the diffusion reflecting portion 62.

An intensity of light emitted from each of the light guide rods and directly reaching the reflecting bar 16 is increased in the central part of the reflecting bar 16. For this reason, it is necessary to increase the diffusion ratio of the diffusion reflecting portion 164 in order to obtain light having an equivalent intensity to the diffusion reflecting portion 62 on the diffusing plate 4. However, part of the light reflected by the reflecting portion 61 also reaches the diffusion reflecting portion 164. For this reason, the diffusion ratio of the diffusion reflecting portion 164 is to be equivalent or higher than that of the diffusion reflecting portion 62. Moreover, the diffusion ratio of the diffusion reflecting portion 164 is set to be equal every region having a predetermined area in the diffusion reflecting portion 164.

As described above, in the liquid crystal display device and the surface light source device according to the second preferred embodiment, the reflecting bar 16 is formed like a strip extended in the same direction as the longitudinal direction of the laser beam guide rod 7, and the diffusion reflecting portions 164 are disposed on the both ends in the short direction of the reflecting bar 16. Accordingly, it is possible to relax a rapid light intensity difference generated in the position corresponding to the vicinity of the end of the reflecting bar 6 in the diffusing plate 4. Therefore, the light can have uniform distribution on the diffusing plate 4. The width and the diffusion ratio of the diffusion fleeting portion 164 are set in consideration of a size of each of the light guide rods, a characteristic of emitted light or the like.

Although the description has been given on the assumption that each region having a predetermined area is set to have an equal diffusion ratio in the diffusion reflecting portion 164 of the reflecting bar 16, moreover, the present invention is not restricted thereto. The diffusion ratio may be varied stepwise for each region having a predetermined area in the diffusion reflecting portion 164. By changing the diffusion ratio stepwise, it is possible to relax a rapid light intensity difference generated in the position corresponding to the vicinity of the end of the reflecting bar 6 in the diffusing plate 4.

While the invention has been shown and described in detail, the foregoing description is in all aspects illustrative and not restrictive. It is therefore understood that numerous modifications and variations can be devised without departing from the scope of the invention.

What is claimed is:

1. A surface light source device comprising:
a first light source for emitting first light;
a first light guide rod having a first light incident surface and causing said first light to be incident from said first light incident surface and converting said first light into first linear light;
a second light source for emitting second light having a greater divergence angle than that of said first light;
a second light guide rod having a second light incident surface and causing said second light to be incident from said second light incident surface and converting said second light into second linear light extended in the same direction as said first linear light;
a reflecting bar being disposed on emission sides of said first light guide rod and said second light guide rod, and having at least one reflecting portion for reflecting part of said first linear light and part of said second linear light and at least one diffusion reflecting portion for diffusing and reflecting a residual part of said first linear light and a residual part of said second linear light, wherein the reflecting portion has greater reflectivity than the diffusion reflecting portion; and
a reflecting member being formed in a box shape such that said first light guide rod, said second light source, said second light guide rod, and said reflecting bar can be accommodated, and having an opening portion with said emission side opened and a reflecting surface for reflecting said first linear light and said second linear light on an inside of said box shape,
wherein said first light incident surface is an end face in a longitudinal direction of said first light guide rod,
said first light source is disposed in an opposed position to said first light incident surface,
said second light incident surface is a surface formed along a longitudinal direction of said second light guide rod at an opposite side to said emission side,
said second light source is disposed in an opposed position to said second light incident surface, and
part of said first linear light and part of said second linear light are reflected by said reflecting portion of said reflecting bar and said reflecting surface, and a residual part of said first linear light and a residual part of said second linear light are diffused and reflected by said diffusion reflecting portion of said reflecting bar and are emitted from said opening portion.

2. The surface light source device according to claim 1, wherein
said first light guide rod is held on said reflecting member with ends of said first light guide rod protruded outside said reflecting member,
said first light source and said first light incident surface are disposed outside of said reflecting member, and
said second light source and said second light guide rod are disposed inside of said reflecting member.

3. The surface light source device according to claim 1, wherein
said reflecting bar is formed like a strip extended in said same direction as the longitudinal direction of said first light guide rod,
said reflecting portions are disposed on a central part and both ends in a short direction of said reflecting bar, and
said diffusion reflecting portions are disposed between said reflecting portion disposed on the central part in the short direction and said reflecting portions disposed on the both ends in the short direction in said reflecting bar.

4. The surface light source device according to claim 3, wherein said diffusion reflecting portion has a diffusing region for diffusing part of said first linear light and part of said second linear light which are received by said diffusion reflecting portion and a reflecting region for a residual part of said first linear light and a residual part of said second linear light, and diffuses said first linear light and said second linear light depending on a diffusion ratio to be a rate of said diffusing region to the whole diffusion reflecting portion.

5. The surface light source device according to claim 1, wherein
said reflecting bars is formed like a strip extended in the same direction as the longitudinal direction of said first light guide rod, and
said diffusion reflecting portions are disposed on both ends in a short direction of said reflecting bar.

6. The surface light source device according to claim 5, wherein said diffusion reflecting portion has a diffusing region for diffusing part of said first linear light and part of said second linear light which are received by said diffusion reflecting portion and a reflecting region for a residual part of said first linear light and a residual part of said second linear light, and diffuses said first linear light and said second linear light depending on a diffusion ratio to be a rate of said diffusing region to the whole diffusion reflecting portion.

7. The surface light source device according to claim 1, wherein
said first light guide rod is disposed on said opening portion side from said second light guide rod, and
said reflecting bar is disposed on said opening portion side from said first light guide rod.

8. The surface light source device according to claim 1, wherein said first light guide rod is made of a transparent material and a diffusing material having a higher refractive index than that of said transparent material and diffuses, reflects and emits said incident first light.

9. The surface light source device according to claim 1, wherein said first light source is a laser beam source.

10. The surface light source device according to claim 1, wherein said second light source is an LED light source.

11. A liquid crystal display device comprising:
the surface light source device according to claim 1; and
a liquid crystal panel for displaying an image by illumination of light from said surface light source device.

* * * * *